May 20, 1930.　　　K. BAUDISCH　　　1,758,996
METHOD OF TESTING AND STARTING HIGH TENSION LINES
Filed Sept. 24, 1928　　　2 Sheets-Sheet 1
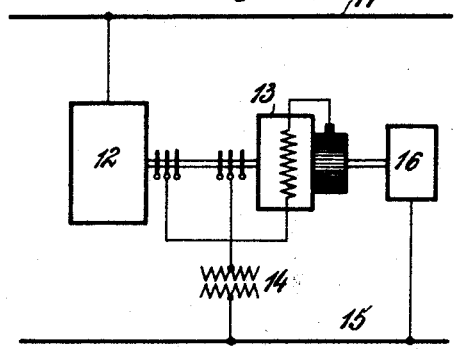
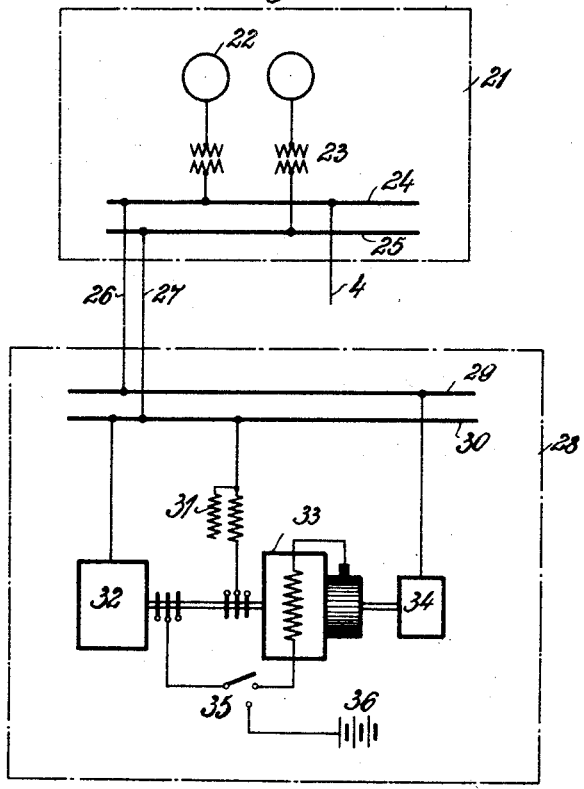
Inventor
Karl Baudisch
by
Knight&co
atty.

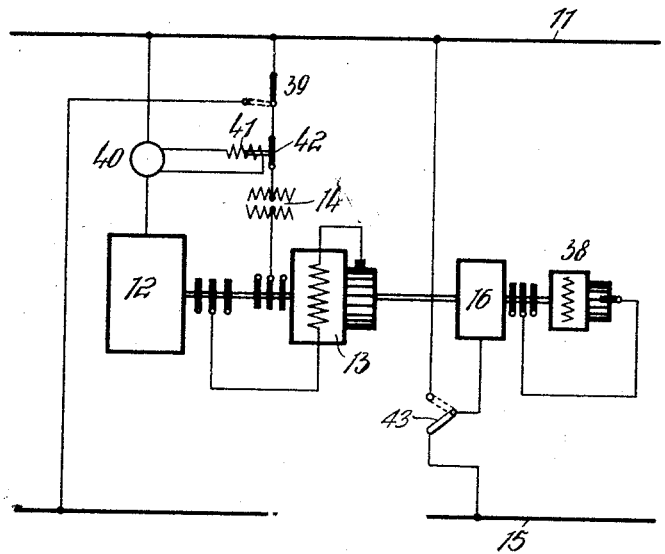

Patented May 20, 1930

1,758,996

UNITED STATES PATENT OFFICE

KARL BAUDISCH, OF BERLIN-WILMERSDORF, GERMANY, ASSIGNOR TO SIEMENS-SCHUCKERTWERKE AKTIENGESELLSCHAFT, OF BERLIN-SIEMENSSTADT, GERMANY, A CORPORATION OF GERMANY

METHOD OF TESTING AND STARTING HIGH-TENSION LINES

Application filed September 24, 1928, Serial No. 307,894, and in Germany September 29, 1927.

My invention relates to a method of testing and starting high-tension lines.

It is well known that the starting of extensive high-tension lines generally causes great difficulties on account of the large charging currents. These difficulties are increased, if the high-tension network contains cable sections. If a line is to be taken into service, which has been cut out in consequence of a short-circuit or ground, it is first necessary to examine it with regard to its state before it can again be taken into regular operation. To apply the full voltage to the line to be tested is not advisable, since the line might become damaged by the current rush or surge taking place when switching on the supply.

It has therefore been suggested to bring the line to be switched in or to be tested gradually up to the rated voltage by means of synchronous generators. In this way the switching surge is avoided, but this method has the disadvantage, that when a fault develops in the line to be tested, such as a ground or a short-circuit this fault is continuously fed with current until the generator is switched off, so that apart from the rush short-circuit current, it has to withstand also part of the continuous short-circuit current of the generator. This is in many cases undesirable because the fault is liable to be increased thereby.

My invention relates to a method of testing and starting high-tension lines by which the short-circuit current of the generators is reduced when an earth or a short-circuit has developed in the line to be tested. According to my invention the line to be tested is gradually charged by means of an asynchronous generator supplying wattless current, and the rotor of which is excited in such a manner, that if a short circuit develops in the line the generator automatically reduces its voltage, so that the already low short-circuit current of the asynchronous machine is still further reduced. The excitation of the rotor of the asynchronous machine is according to my invention effected by an exciter, which in its turn is excited either continuously from a separate alternating current network or temporarily from a source of direct current and then continuously from the section of the network to be tested.

In the drawing affixed hereto and forming part of my specification two embodiments of my invention are illustrated diagrammatically. In the drawing—

Fig. 1 shows one arrangement or system for carrying out my improved method,

Fig. 2, a modified system, and

Fig. 3 shows a further modified system, including a compensated auxiliary asynchronous motor.

In both figures of the drawing one phase only of the three-phase circuit is shown. The line 11 to be tested receives its voltage from an asynchronous generator 12, the rotor of which is excited by a three-phase exciter 13, which in its turn is excited from a network 15 through an adjustable voltage transformer 14, the construction of which is immaterial.

In line with the shaft of the asynchronous generator 12 and the exciter 13 and mechanically coupled with them is an auxiliary motor 16 connected to the network 15 and by which the machine set 12 and 13 is brought up to the desired speed prior to being connected to the network to be tested. The asynchronous generator 12 is first in its unexcited state connected with the network 11 and is gradually brought to full voltage by increasing the excitation of the exciter 13.

If now a short-circuit develops in the line 11 at a certain voltage, the fault has to withstand the rush short-circuit current from the asynchronous generator 12 only, which is caused by the sum of the leakages of the rotor and stator of the asynchronous generator. If, on the other hand, the line 11 is in working order, it can be taken into commission after a corresponding setting of the frequency, for instance by connecting it to the generator of a power station.

Referring now to Fig. 3, this figure shows a modification of the arrangement shown in Fig. 1 in which the asynchronous auxiliary motor 16 is compensated by means of a commutator machine 38 mechanically coupled with it, and whose commutator brushes are connected with the slip rings of the asynchronous motor. By over exciting this motor after the generator 12 has been brought to full speed and the line has been taken into full operation, it can be used for furnishing wattless energy independent of the generator 12. For this purpose the auxiliary exciter machine 38 is provided in well known manner with a separate field winding.

In order to be able to test either of the two lines 11 and 15 in Figs. 1 and 3, and to be able to start either of the two line systems, I connect, as is shown in Fig. 3, transformer 14 at its secondary side with the slip rings of the exciter machine 13, and connect the primary winding of the transformer to a change over switch 39, by which this primary winding can be connected either to line 11 or to line 15 at will. Likewise, as is shown by the change over switch 43, the asynchronous auxiliary motor 16 may be connected at will to either line 11 or line 15 according to which line is to be under test.

As Fig. 3 further shows, in the line connection between the output side of generator 12 and the line under test is disposed a wattmetric relay 40 which responds to watt energy supplied into the line by generator 12. A cut out switch 42 is arranged between the transformer 14 and change over switch 39, and is controlled by the response of the wattmetric 40, for instance by means of a solenoid 41. By this arrangement transformer 14, and thus exciter machine 13 is disconnected from the test line when, owing to a fault in the test line a heavy watt current should flow aside from the wattless current furnished by asynchronous machine 12. When by such a response of relay 40 to the watt current the exciter machine 13 is disconnected, asynchronous machine 12 is quickly deenergized so that the fault in the test line is not further exposed to short circuit currents.

Referring to Fig. 2 of the drawing illustrating a further modification of my invention, it will be observed that in the power station 21 the generators 22 work on the busbars 24 and 25 through the transformers 23. From these busbars lines 26 and 27 lead to the busbars 29 and 30 in the substation 28. In this substation is located the asynchronous generator 32 with the three-phase exciter 33, the rotor of which is connected to the busbars 30 through the adjustable voltage transformer 31. The auxiliary motor 34 is connected to the busbar 29 and again serves to bring the machine set to the desired speed. In the exciter circuit of the asynchronous machine 32 is included a change-over switch 35 by means of which the rotor of the asynchronous machine may be connected to a source of direct current 36.

Assuming that the line 27 should after a short-circuit be tested in regard to its state and be set under tension again.

In the substation 28 the asynchronous generator 32 brought to normal speed by the auxiliary motor 34 is then connected to the line 27, its rotor being temporarily connected with the source of direct current 36 by means of the change-over switch 35. The asynchronous generator 32 then becomes excited by this short direct current impulse. The voltage transformer 31 is during this time set for the lowest voltage value. After the excitation has taken place with direct current the change-over switch 35 is thrown over, so that the asynchronous machine 32 is connected to the three-phase exciter 33. Preferably the change-over switch 35 is designed in such a manner, that the changing over takes place without an interruption of the circuit.

By means of the voltage transformer 31 the voltage supplied to the exciter 33 is then gradually increased and thereby also the voltage of the asynchronous generator 32. If during the increase of the voltage a flashover between the phases occurs in the line 27, the voltage of the asynchronous machine drops in the case of a three-pole short-circuit down to zero within a few cycles, and in the event of a two-pole short-circuit the exciter 33 is unsymmetrically excited, whereby the sustained short-circuit current of the asynchronous machine 32 is considerably reduced in comparison with that of a synchronous machine. The asynchronous machine may in this case be demagnetized in a short time by well known means, for instance by a wattmetric relay.

In the power station may be provided a special motor designed as asynchronous machine, which serves to apply the voltage gradually to the high-tension lines, whereby excessively strong short-circuit currents are avoided and burnouts at the fault and other disturbances are prevented on the line to be taken into commission again after a short-circuit.

Instead of the rotor-excited exciter for the asynchronous machine exciters of any other suitable construction may, of course, be employed.

Various modifications and changes may be made without departing from the spirit and the scope of the invention, and I desire, therefore, that only such limitations shall be placed thereon as are imposed by the prior art.

I claim as my invention:

1. Apparatus for testing and starting high-tension lines, comprising in combination, a rotor excited asynchronous generator adapted to supply wattless current to the line to be tested, a three-phase current exciter for exciting the rotor of said generator, a second alternating current network, an adjustable voltage transformer adapted to energize said exciter and connected to said second alternating current network, and an auxiliary motor mechanically coupled with said generator and said exciter and connected to said second alternating current network.

2. In a system for testing and starting high tension lines, embodying an asynchronous generator for delivering wattless current from its stator into the line, and being driven by an auxiliary motor, and an outside excited three phase alternating current exciter machine coupled with the generator for exciting the generator rotor; the method of testing and starting the line consisting in first running the generator up to full speed, and then gradually exciting the generator rotor from said exciter machine to full voltage.

3. In a system for testing and starting high tension lines, embodying an asynchronous generator for delivering wattless current from its stator into the line, and being driven by an auxiliary motor, and a three phase alternating current exciter machine coupled with said generator and excited from the line to be tested for exciting the generator rotor; the method of testing and starting the line consisting in first running the generator up to full speed, then connecting the exciter winding of the exciter machine to the line to be tested, and then gradually exciting the generator rotor from said exciter machine to full voltage.

4. In a system for testing and starting high tension lines, embodying an asynchronous generator for delivering wattless current from its stator into the line, a three phase exciter machine coupled with said generator and excited by way of a transformer from the line to be tested, and a source of direct current and a change over switch for connecting the generator rotor with said source or said exciter machine at will; the method of testing and starting the line, consisting in first running said generator up to full speed, then connecting said exciter machine to the line to be tested, then connecting the generator rotor first to the direct current source and then to the exciter machine, and then gradually exciting the generator rotor from said exciter machine to full voltage.

5. Arrangement for testing and starting high tension lines, comprising in combination a rotor-excited asynchronous generator connected to the test line and adapted to deliver wattless current into said line, a three phase exciter machine for exciting the rotor of said generator, an alternating current line which is in normal operation, an adjustable transformer for exciting said exciter machine and a change-over switch for connecting said transformer at will to either of said two lines, and an auxiliary motor mechanically coupled with said generator and said exciter machine, and electrically connected with said normally operating alternating current line.

6. Arrangement for testing and starting high tension alternating current lines, comprising in combination a rotor-excited asynchronous generator, connected to the test line and adapted to deliver wattless current into said line, a three phase main exciter machine for exciting the rotor of said generator, a second normally operating alternating current line system, an adjustable transformer for exciting said main exciter machine and a change-over switch for connecting said transformer at will to either of said two alternating current lines, a compensated auxiliary asynchronous motor and an auxiliary exciter machine mechanically coupled and electrically connected with the rotor of said auxiliary motor, said motor being mechanically coupled with said generator and said main exciter machine, and being electrically connected with said second line system, said asynchronous motor being capable of delivering wattless energy independently of said generator when the first line system is in full operation.

7. Arrangement for testing and starting high tension lines, comprising in combination a rotor-excited asynchronous generator connected to the test line and adapted to deliver wattless current into said line, a three phase exciter machine for exciting the rotor of said generator, an alternating current line which is in normal operation, an adjustable transformer for exciting said exciter machine and a change-over switch for connecting said transformer at will to either of said two lines, and an auxiliary motor mechanically coupled with said generator and said exciter machine and electrically connected with said normally operating alternating current line, a cut-out switch connected between said transformer and said change-over switch, a wattmetric relay connected between said generator and the test line and operatively connected with said cut-out switch, to open the latter when, due to a fault in the test line, an undue amount of watt energy flows between the generator and the test line.

8. Arrangement for testing and starting high tension alternating current lines, comprising in combination a rotor-exciter asynchronous generator, connected to the test line and adapted to deliver wattless current into said line, a three phase main exciter machine for exciting the rotor of said generator, a second normally operating alternating current line system, an adustable transformer for exciting said main exciter machine and a change-over switch for connecting said transformer at will to either of said two alternating current lines, a compensated auxiliary asynchronous motor and an auxiliary exciter machine mechanically coupled and electrically connected with the rotor of said auxiliary motor, said motor being mechanically coupled with said generator and said main exciter machine, and being electrically connected with said second line system, said asynchronous motor being capable of delivering wattless energy independently of said generator when the first line system is in full operation, a cut-out switch connected between said transformer and said change-over switch, a wattmetric relay connected between said generator and the test line and operatively connected with said cut-out switch, to open the latter when, due to a fault in the test line, an undue amount of watt energy flows between the generator and the test line.

In testimony whereof I affix my signature.

KARL BAUDISCH.